(12) United States Patent
Birsching et al.

(10) Patent No.: US 7,434,654 B2
(45) Date of Patent: Oct. 14, 2008

(54) ELECTRIC PRELOAD FOR VARIABLE EFFORT STEERING SYSTEM

(75) Inventors: Joel E. Birsching, Vassar, MI (US); Scott E. Weiss, Bay City, MI (US); Sanket S. Amberkar, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/846,713

(22) Filed: Aug. 29, 2007

(65) Prior Publication Data

US 2007/0289805 A1 Dec. 20, 2007

Related U.S. Application Data

(62) Division of application No. 11/092,641, filed on Mar. 29, 2005, now Pat. No. 7,264,080.

(60) Provisional application No. 60/650,445, filed on Feb. 4, 2005.

(51) Int. Cl.
*B62D 5/06* (2006.01)
*B62D 6/00* (2006.01)

(52) U.S. Cl. .................... 180/422; 180/421; 701/41

(58) Field of Classification Search ................ 180/421, 180/422, 443, 444, 446; 701/41–43
See application file for complete search history.

(56) References Cited

U.S. PATENT DOCUMENTS

| | | | |
|---|---|---|---|
| 3,022,772 A | 2/1962 | Zeigler et al. | |
| 4,454,801 A | 6/1984 | Spann | |
| 4,858,134 A * | 8/1989 | Eto et al. | 701/41 |
| 5,029,660 A * | 7/1991 | Raad et al. | 180/422 |
| 5,119,898 A | 6/1992 | Eckhardt et al. | |
| 5,517,096 A | 5/1996 | Shtarkman et al. | |
| 5,738,182 A | 4/1998 | Birsching et al. | |
| 5,749,431 A * | 5/1998 | Peterson | 180/422 |
| 5,749,432 A | 5/1998 | Birsching | |
| 6,239,568 B1 * | 5/2001 | Sugitani et al. | 318/466 |
| 6,615,948 B2 | 9/2003 | Kim | |

FOREIGN PATENT DOCUMENTS

| | | |
|---|---|---|
| EP | 0375137 | 6/1990 |
| EP | 0816207 | 1/1998 |

* cited by examiner

*Primary Examiner*—Lesley D. Morris
*Assistant Examiner*—Marc A. Scharich
(74) *Attorney, Agent, or Firm*—Michael D. Smith

(57) ABSTRACT

A power steering system for a vehicle includes a hydraulic system for controlling resistance of a steering wheel. A valve of the hydraulic system is connected to a coil which varies positioning of the valve. A method for controlling the resistance of the steering wheel includes turning the steerable wheels of the vehicle in response to rotation of the steering wheel. The angle of the steering wheel and the speed of the vehicle are sensed and inputted into a controller. A lateral acceleration is determined based on the sensed signals by the controller. A recommended current rate of the coil is determined based on the lateral acceleration. An adjustment to the recommended current rate of the coil is determined based upon the speed of the vehicle. The recommended current rate is also modified based upon the adjustment. The modified current rate of the coil is then applied to the coil to vary the stiffness of the valve, which in turn varies the resistance to turning the steerable wheels of the vehicle.

14 Claims, 6 Drawing Sheets

Figure 3: Prior Art Current Draw

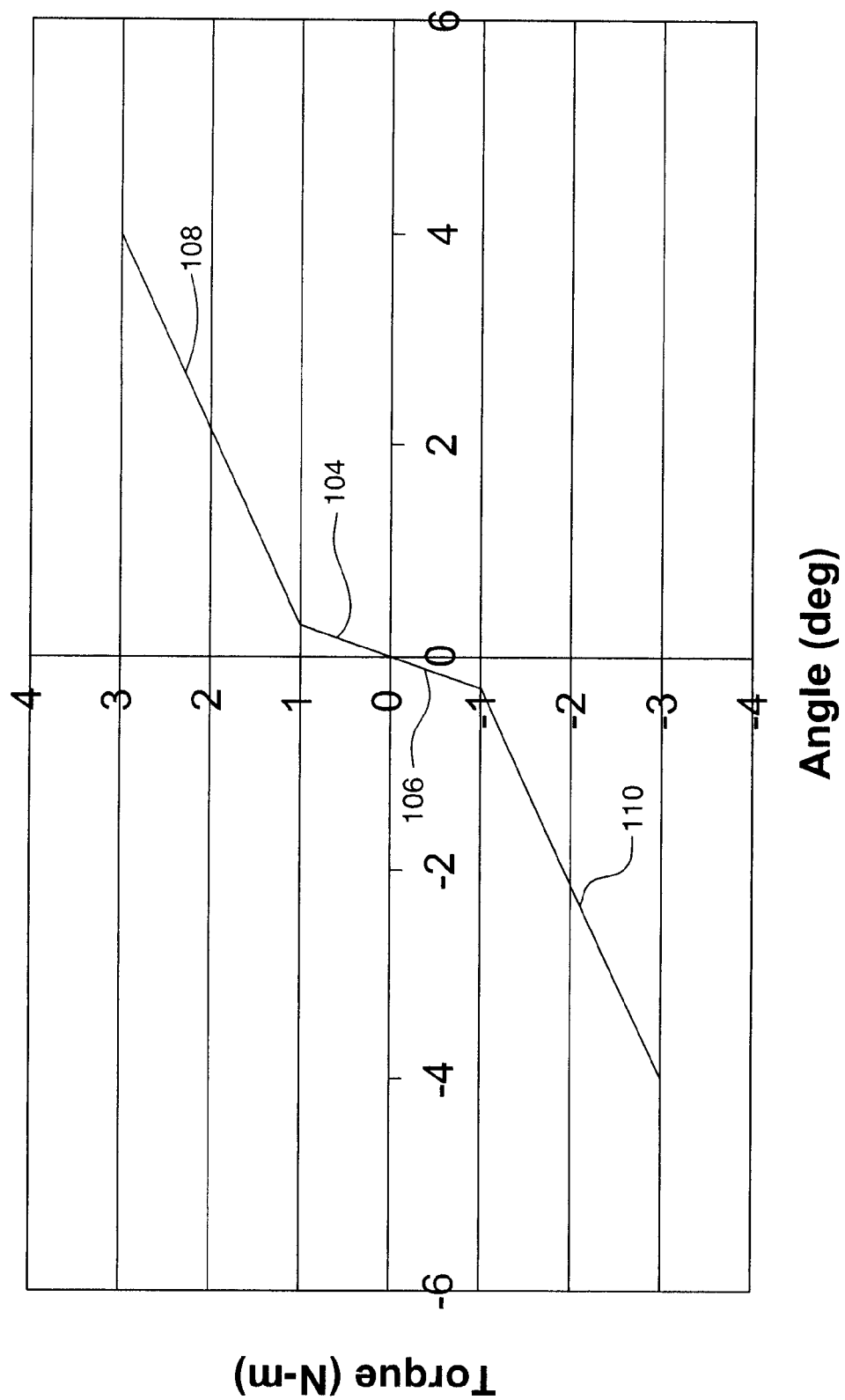

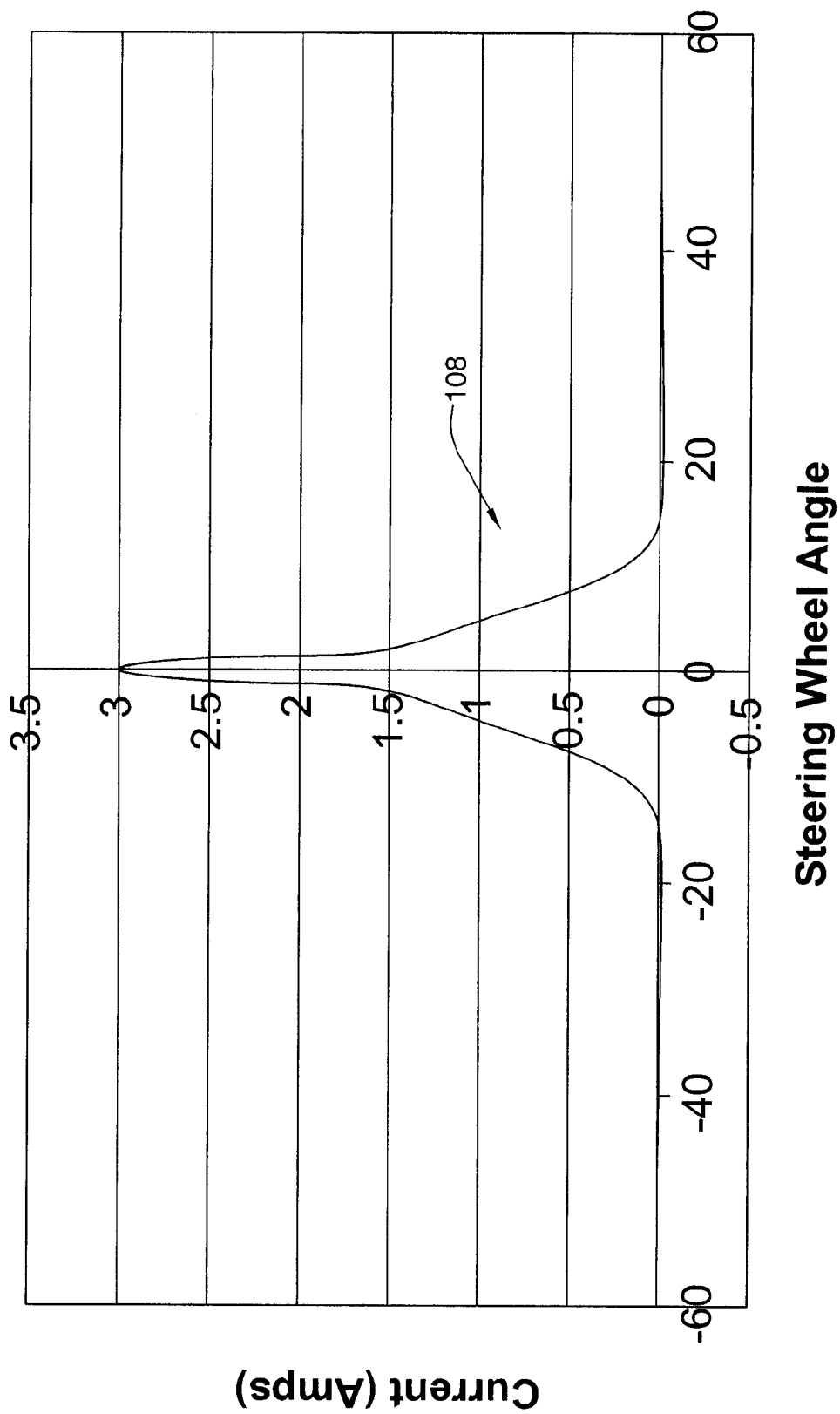
Figure 6: Current Draw

ELECTRIC PRELOAD FOR VARIABLE EFFORT STEERING SYSTEM

CROSS-REFERENCE TO RELATED APPLICATION

This application is a divisional patent application of U.S. patent application Ser. No. 11/092,641, filed on Mar. 29, 2005, which claims the benefit of U.S. Provisional Patent Application Ser. No. 60/650,445 for an ELECTRIC PRE-LOAD FOR VARIABLE EFFORT STEERING SYSTEM, filed on Feb. 4, 2005, which is hereby incorporated by reference in its entirety.

FIELD OF THE INVENTION

This invention relates to a power steering apparatus for a vehicle having an electromagnetic control apparatus of the variable reluctance type for varying the driver steering effort required to produce a given level of power assist.

BACKGROUND OF THE INVENTION

Power steering systems assist a drive in turning at least two wheels of a vehicle. The driver engages a steering wheel and the power steering system is operably disposed along the mechanical linkage between the steering wheel and the turnable wheels of the vehicle. U.S. Pat. No. 5,070,956 describes a hydraulic power assist steering system having conventional relatively rotatable spool and valve body elements coupled to a vehicle steerable wheel and steering wheel for regulation of a hydraulic steering assist boost pressure, a torsion bar creating a mechanical centering torque between the spool and valve body elements, and an integral electromagnetic mechanism which defines an additional coupling of variable resilience between the spool and valve body elements for adjusting driver steering effort required to produce a given level of power assist.

SUMMARY OF THE INVENTION AND ADVANTAGES

The invention provides a method for controlling stiffness in a power steering system for a vehicle. A pinion and a spool shaft are engaged with respect to one another for turning at least two wheels of a vehicle in response to rotation of a steering wheel from an on-center orientation. Movement of the pinion is variably assisted with a hydraulic power steering device having a valve movable between a closed configuration and an open configuration. The valve is moved from the open configuration to the closed configuration in response to rotation of the spool shaft relative to the pinion. A torsion rod having a first stiffness is disposed between the pinion and spool shaft to resist rotation of the spool shaft relative to the pinion and resist movement of the valve from the open configuration to the closed configuration. A variable magnetic coupling having a second stiffness is disposed in parallel with the torsion rod to resist rotation of the spool shaft relative to the pinion. The first stiffness and the second stiffness cooperate to define an overall valve stiffness. The second stiffness generated by the variable magnetic coupling is varied with an electric coil to vary the overall valve stiffness. The second stiffness generated by the variable magnetic coupling is maximized when the steering wheel is in the on-center orientation.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a third graph illustrating valve stiffness generated by the exemplary power steering systems relative to an angle between a valve body and spool valve portion; and FIG. 6 is a fourth graph illustrating current drawn to generate a magnetic field with the magnetic coupling relative to an angle of a steering wheel according to the exemplary embodiment of the invention.

DETAILED DESCRIPTION OF THE PREFERRED EMBODIMENT

Figure 1:
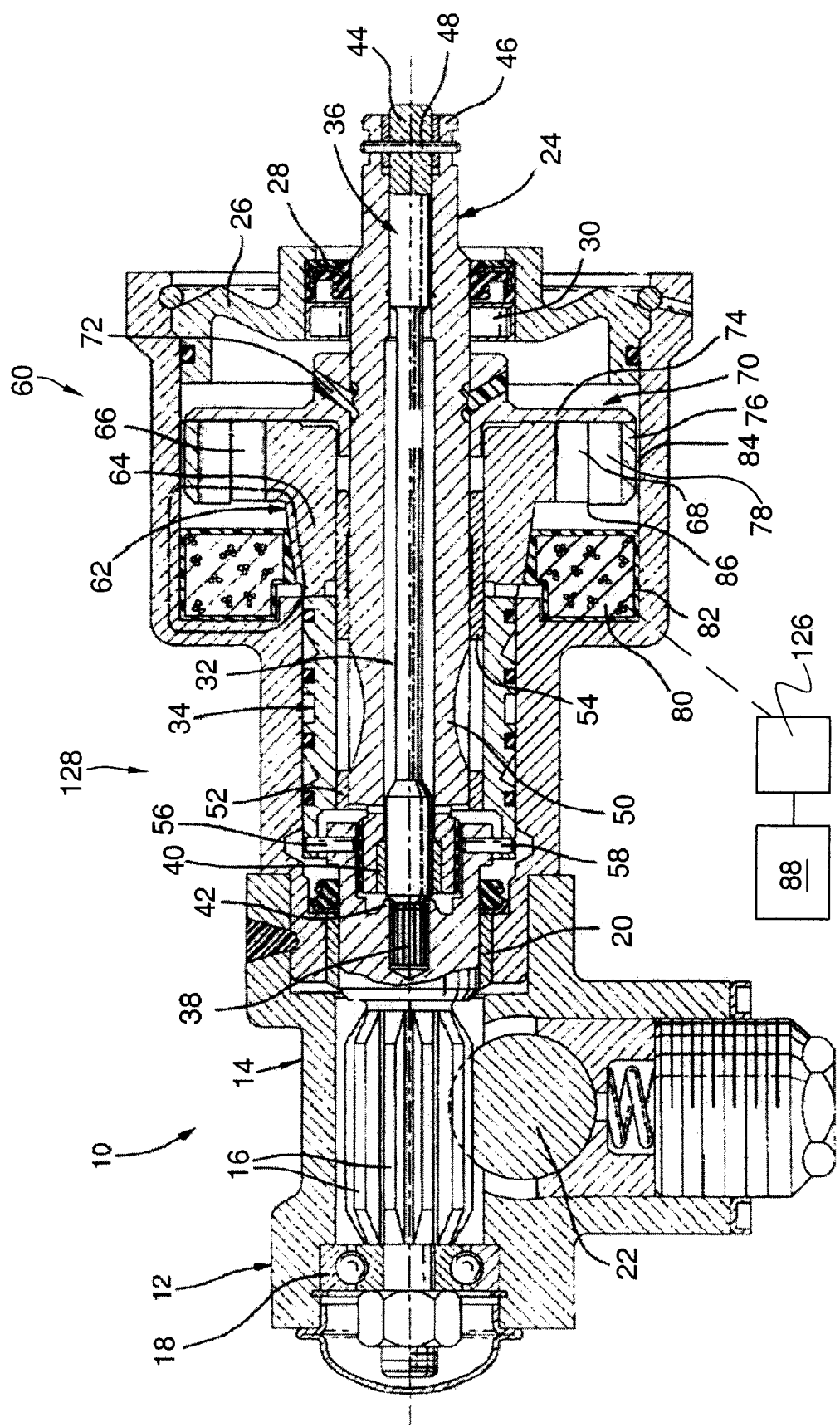
FIG. 1 is a longitudinal cross-sectional view of a motor vehicle power steering gear according to the exemplary embodiment of the invention.

U.S. Pat. Nos. 5,738,182; 5,119,898; 4,454,801; and 3,022,772 are incorporated by the reference to the present application. The incorporated patents set forth the structure and operation of well-known power steering systems.

A variable effort motor vehicle power steering system 10 according to the exemplary embodiment of the invention includes a housing 12. A pinion 14 having a plurality of gear teeth 16 is rotatably supported in housing 12 by a roller bearing 18 and a bearing 20. A rack bar 22 having a plurality of rack teeth meshing with the gear teeth 16 on the pinion 14 is supported by the housing 12 for movement perpendicular to the pinion 14 in response to rotation of the pinion 14. The ends of rack bar 22 (not shown) are connected to steerable wheels of the motor vehicle in a conventional manner.

A spool shaft 24 protrudes into the housing 12 through a cover 26 and annular fluid seal. Spool shaft 24 is supported on cover 26 by a bearing 30 and is provided with an internal axial bore 32. A proportional control valve body 34 is supported for rotation about the spool shaft 24 in the housing 12, similar to the valve described in U.S. Pat. Nos. 4,454,801 and 3,022,772. A torsion rod 36 extends in bore 32 of spool shaft 24. A serrated inboard end 38 of the torsion rod 36 protrudes beyond a corresponding end 40 of the spool shaft 24 within the housing 12 and is force fitted in a bore 42 defined by the pinion 14. An outboard end 44 of torsion rod 36 is connected to an outboard end 46 of spool shaft 24 by a pin 48. Outboard end 46 of spool shaft 24 is connected to a manual steering wheel, not shown, of the motor vehicle for rotation in a conventional manner. A lost motion connection between the spool shaft 24 and the pinion 14 allows for twist (e.g. about 7 degrees) in the torsion rod 36 and relative angular movement between the pinion 14 and the spool shaft 24.

The valve body 34 surrounds a spool valve portion 50 of spool shaft 24 within the housing 12 and is rotatably supported by a pair of sleeves 52 and 54. The valve body 34 and spool valve portion 50 cooperate to define a valve 128. When the valve body 34 and spool valve portion 50 are aligned, or on-center with respect to one another, the valve 128 is open and hydraulic assistance is not provided to assist steering. As the valve body 34 and spool valve portion 50 become increasingly angled with respect to one another, the valve 128 incrementally closes and hydraulic assistance increases to assist steering. A pair of radial pins 56, 58 fixes the valve body 34 for rotation with pinion 14. The valve body 34 is also fixed for rotation with the inboard end 38 of torsion rod 36. Torsional flexure of torsion rod 36 thus produces relative rotation between the valve body 34 and the spool valve portion 50. This relative rotation opens and closes various orifices defined between the valve body 34 and the spool valve portion 50 to regulate the pressure of fluid from a power steering pump (not shown) to a steering assist fluid motor (not shown). Details of the structure and operation of the fluid pressure regulation can be found in the prior art, including the previously mentioned and incorporated by reference U.S. Pat. Nos. 5,738,182; 5,119,898; 4,454,801; and 3,022,772. However, this structure and operation is merely background and environment; its precise nature is not relevant to the understanding of this invention, except to note that, the more the valve body 34 is rotated relative to the spool valve portion 50, in either direction, from on-center position wherein torsion rod 36 is unflexed or untwisted, the greater will be the differential fluid pressure and consequent steering assist force in the corresponding direction. The on-center position of the torsion rod 36 corresponds to on-center orientation of the steering wheel of the vehicle and also corresponds to the turnable wheels of the vehicle being substantially aligned with a longitudinal axis of the vehicle.

The torsion rod 36 defines a first valve stiffness of the steering system 10. A magnetic coupling 60 defines a second valve stiffness of the steering system 10. Valve stiffness relates to the stiffness associated with rotating the valve body 34 and the spool valve portion 50 relative to one another to engage hydraulic steering assist. Steering stiffness relates to the overall stiffness of the steering system. Valve stiffness and steering stiffness are related in that, generally, the greater the valve stiffness the greater the steering stiffness. However, steering stiffness corresponds to vehicle speed and lateral acceleration of the vehicle, while valve stiffness is not necessarily related to vehicle speed and lateral acceleration of the vehicle. The magnetic coupling 60 and the torsion rod 36 are operably disposed in parallel to one another, cooperating to define an overall valve stiffness of the steering system 10. The second stiffness is variable, as set forth more fully below.

The magnetic coupling includes a first member 62 pressed onto sleeve 54 such that the valve body 34, the first member 62, and the sleeves 52, 54 are rotationally fixed relative to one another for concurrent rotation about the spool shaft 24. The first member 62 includes a hub portion 64 extending axially in the outboard direction and a tooth portion 66 extending radially outward from hub portion 64, ending in a plurality (26 in this embodiment, although 24 may be preferred) of radially outwardly projecting teeth 68.

The magnetic coupling 60 also includes a second member 70 is rotationally fixed by plastic injection 72 to the spool shaft 24. Thus, relative rotation between spool shaft 24 and pinion 14/valve body 34 results in corresponding relative rotation between the first member 62 and the second member 70. The second member 70 includes a non-magnetic hub portion 74 and a magnetic tooth portion 76 having teeth 78. The hub portion 74 extends radially outward from the spool shaft 24 and the tooth portion 76 extends from the hub portion 74 axially toward and over the teeth 68 of the first member 62. The tooth portions 66, 76 are radially spaced from another, the tooth portion 76 surround the tooth portion 66. Each tooth 78 is directed radially inwardly toward a corresponding tooth 68. When the valve body 34 and steering wheel are on-center, the teeth 68, 78 are radially aligned.

An electric coil 80 receives a current at rate to generate a magnetic field tending to urge the teeth 68, 78 into alignment. The coil 80 is wound in an insulating bobbin 82 and retained in axial orientation relative to the housing 12. The hub portion 64 of the first member extends through the coil 80. The teeth 68 are disposed axially adjacent coil 80. The housing 12 is made of a magnetic material such as malleable cast iron. The valve body 34 is made of a magnetic material such as steel. The first member 62 is made of magnetic phosphorus powdered iron in a powdered metal process, as is tooth portion 76 of second member 70. Hub portion 74 of second member 70 is made of a stiff, non-magnetic material such as stainless steel. Cover 26 is made of a non-magnetic material such as aluminum. A magnetic flux circuit is thus defined around coil 80 as shown by the dashed line surrounding the coil 80, across a radially outer air gap 84 between housing 12 and tooth portion 76 of second member 70, through tooth portion 76 and teeth 78, across the air gap 86 between teeth 78 and opposing teeth 68 of the first member 62 and through hub portion 64 and valve body 34 back to the housing 12 through an air gap. Since hub portion 74 of second member 70 and cover 26 are non-magnetic, there is no significant leakage flux bypassing the air gaps and this concentrates the maximum flux generated by current in coil 80 across these air gaps. In addition, since teeth 68 and 78 are radially rather than axially disposed relative to each other, magnetic forces between the valve body 34 and the spool shaft 24 are radial and circumferential, minimizing axial loads between the valve body 34 and the spool shaft 24. The rate of current directed through the coil 80 can be changed to change the strength of the magnetic field and, thus, the torque urging the teeth 68, 78 into alignment.

The magnetic coupling 60 operates as a variable reluctance torque generator. There are no permanent magnets and the only magnetic flux is that generated by an electric current provided through coil 80. This flux is concentrated in the magnetic material around the magnetic circuit described above, with low fringing and leakage flux and with three significant air gaps in series. The radially outer air gap 84 between housing 12 and tooth portion 76 of second member 70 does not vary significantly with relative rotation of the teeth. The air gap 86 between opposing teeth 68 and 78 comprises the plurality of parallel air gaps between all opposing teeth. This varies with relative rotation between the first and second members 62, 70. In the centered position of spool shaft 24 and torsion rod 36, teeth 68 of first member 62 are aligned with teeth 78 of the second member 70 and the air gaps 86 are minimized. A current in coil 80 generates a torque between first member 62 and second member 70 which attempts to reduce the total reluctance, minimizing the air gaps 86.

Without consideration of the torsion rode 36 and the magnetic coupling 60, the stiffness of the steering system 10 is generally lowest when the torsion bar 36 and steering wheel are on-center. As vehicle speed increases and as the angle of the steering wheel from on-center increases, steering stiffness increases. It can be desirable to arrange the steering system so that steering system stiffness is generally the same throughout the range of steering wheel angle and throughout the range of vehicle speed. Since the stiffness is generally relatively smaller when the steering wheel is on-center and generally relatively greater when the steering wheel is off-center, it may be desirable to pre-stiffen the steering valve to increase valve stiffness (tending to align the valve body 34 and spool valve portion 50 and tending to prevent hydraulic steering assist) when the steering wheel is on-center and reduce the pre-stiffness as the steering wheel moves from on-center, since the other components of the steering system will increase the stiffness of the system. In the exemplary embodiment of the invention, the magnetic coupling 60 is controlled by a controller 88 to maximize the torque between the first and second members 62, 70 when the torsion rod 36 and steering wheel is on center and reduce the torque between the first and second members 62, 70 as the torsion rod 36 and steering wheel move from on-center. This has been done in the past with mechanical devices.

Figure 2:
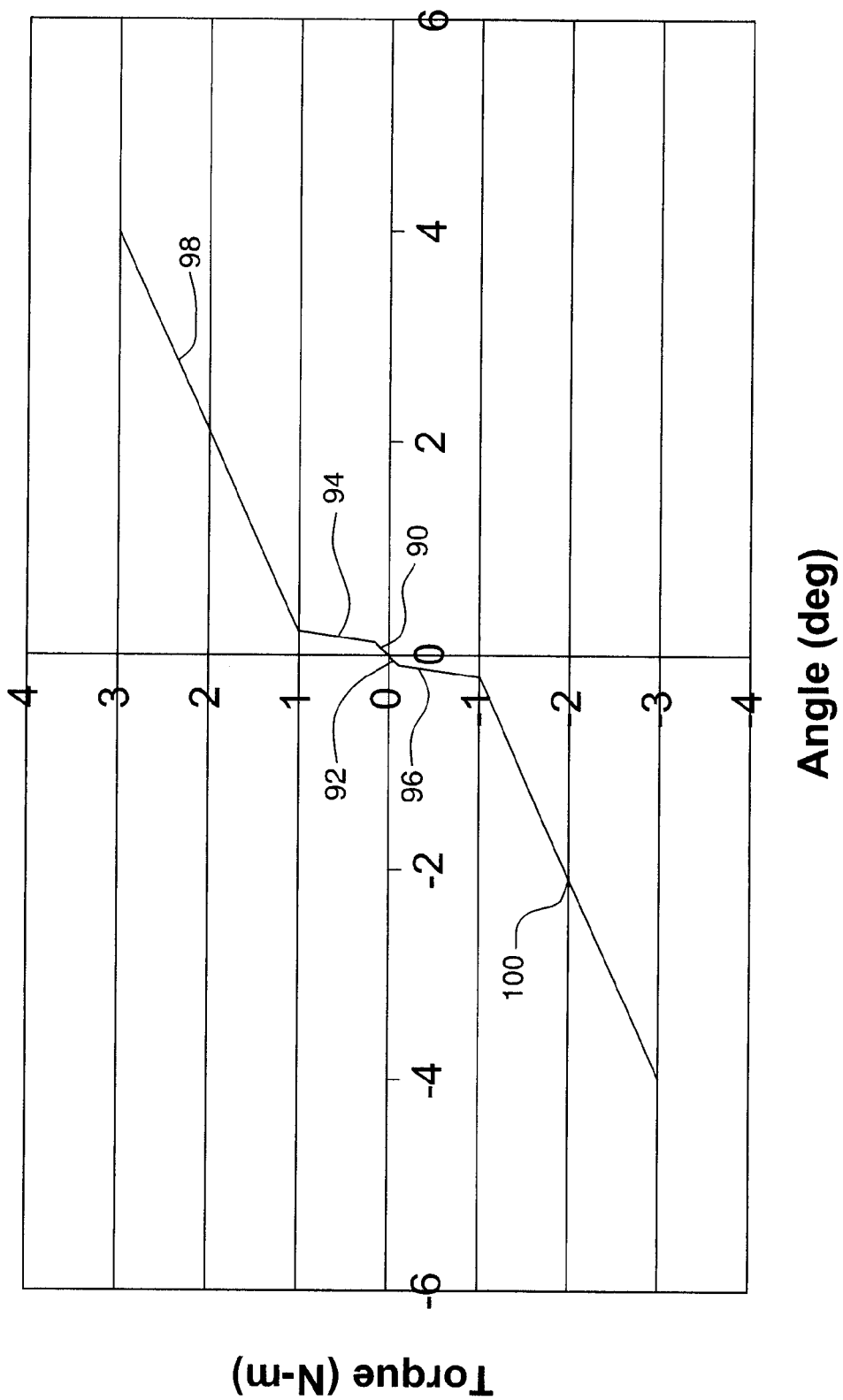
FIG. 2 is a graph illustrating valve stiffness generated by previous power steering systems relative to an angle between a valve body and spool valve portion.
Figure 3:
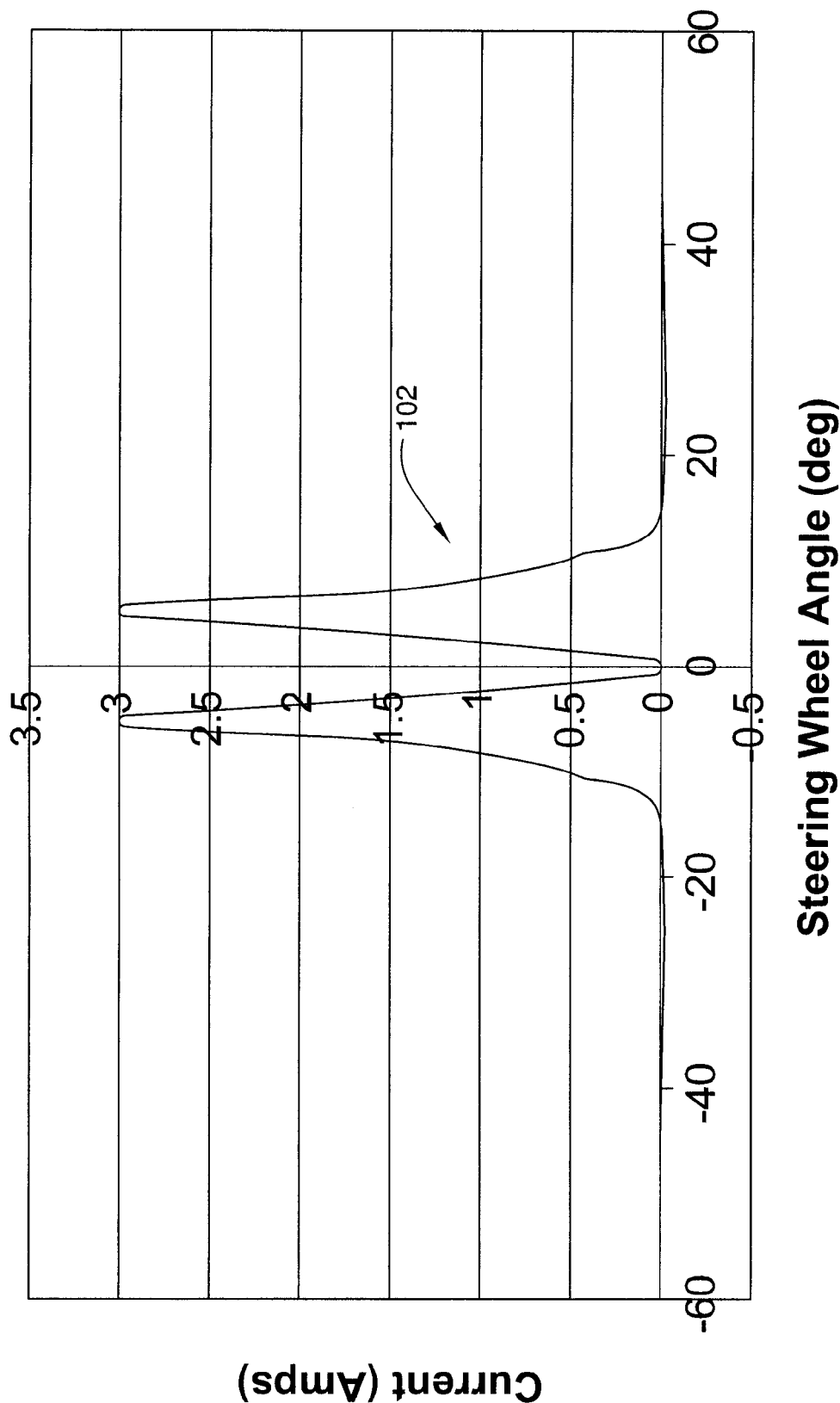
FIG. 3 is a second graph illustrating current drawn to generate a magnetic field with a magnetic coupling of previous power steering systems relative to an angle of a steering wheel.

FIG. 2 is a graph illustrating a previous relationship between valve stiffness (torque) and the angle of the valve body 34 and the spool valve portion 50 relative to one another. Line portions 90 and 92 represent relatively small increases in torque as the valve body 34 and the spool valve portion 50 rotate relative to one another from on-center, represented by the Y-axis. Line portions 94 and 96 represent relatively large increases in torque as the valve body 34 and the spool valve portion 50 rotate relative to one another further from on-center. Line portions 98 and 100 represent relatively small increases in torque as the valve body 34 and the spool valve portion 50 rotate relative to one another further from on-center. The line portions 90, 92, 98, 100 are substantially parallel with one another. FIG. 3 is a second graph illustrating current drawn to generate a magnetic field with a magnetic coupling of the previous power steering systems versus to an angle of the valve body 34 and the spool valve portion 50 relative to one another. FIGS. 2 and 3 correspond with one another. The angle of the steering wheel from on-center corresponds to the angle of the valve body 34 and the spool valve portion 50 relative to one another. Line portions 94 and 96 correspond to portions of line 102 where current is being drawn. The line portions 90, 92, 98, 100 correspond to portions of the line 102 where current is not being drawn. As shown in FIG. 3, no current is being drawn when the valve body 34 and the spool valve portion 50 are on-center in the previous system.

Figure 4:
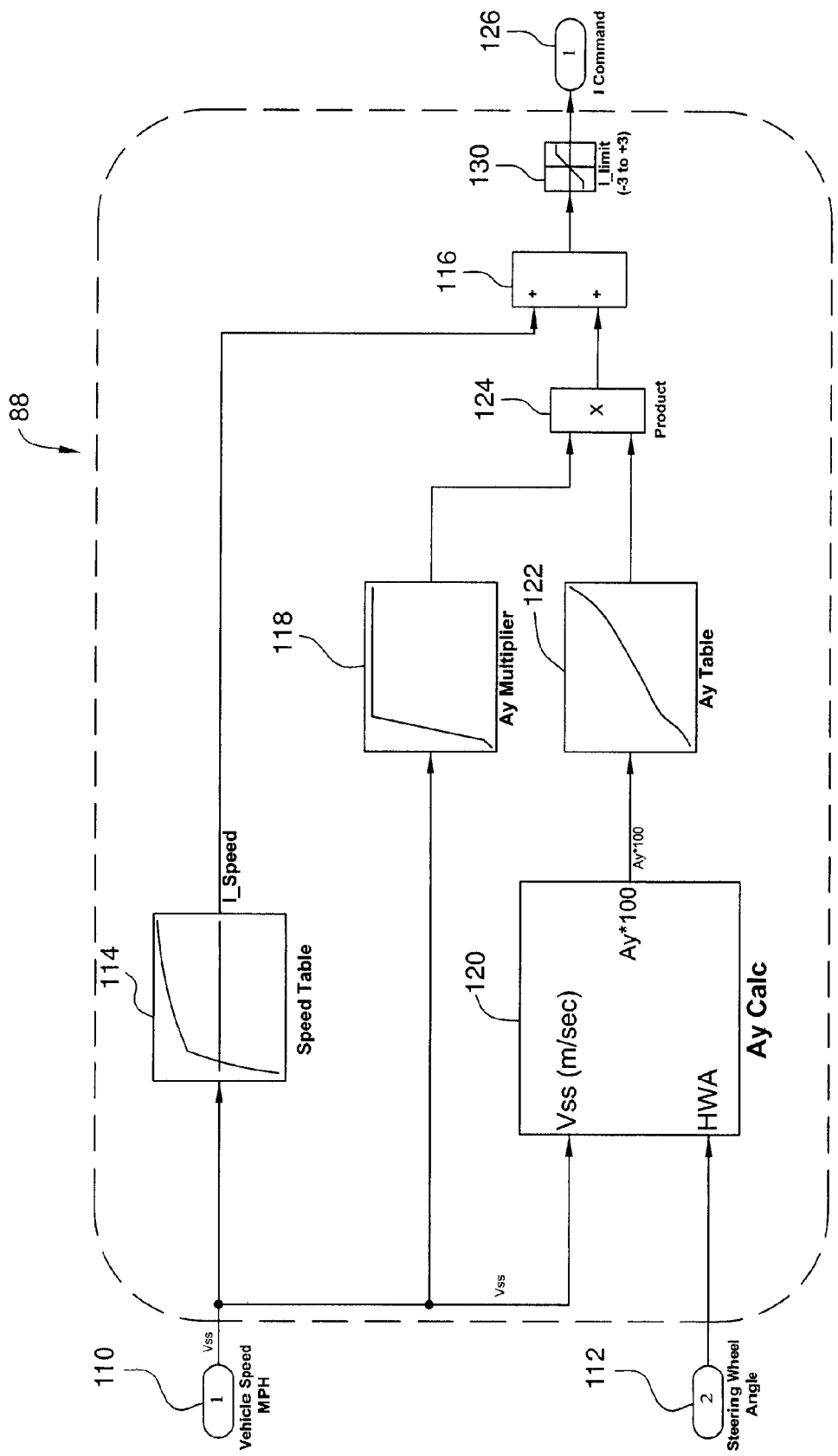
FIG. 4 is a schematic drawing of a controller for controlling an amount of current drawn by a magnetic coupling according to the exemplary embodiment of the invention.

FIG. 4 is a schematic drawing of the controller 88 (in dash line) for controlling the rate of current directed through the coil 80. The controller 88 communicates with a vehicle speed sensor 110 and a steering wheel angle sensor 112. The speed sensor 110 communicates a signal corresponding to vehicle speed to a speed table 114 of the controller 88. The speed table 114 identifies a recommended current rate of the coil 80 in view of the signal received from the sensor 110, the recommendation is based on the performance of a calculation or based on a comparison of the signal to a table. For example, based on the signal from the sensor 110, the speed table 114 may communicate a recommended current of two amps to a summation operator 116 of the controller 88.

The angle sensor 112 communicates a signal corresponding to steering wheel angle to a lateral acceleration calculator 120. The lateral acceleration calculator 120 also receives a signal from the speed sensor 110. Data corresponding to speed and wheel angle are applied by the lateral acceleration calculator 120 to calculate the lateral acceleration, which is communicated to a lateral acceleration table 122. The lateral acceleration table 122 identifies a recommended current rate of the coil 80 in view of the signal received from the sensors 110 and 112. The recommendation is based on the performance of a calculation or based on the comparison of the signals to a table.

The speed sensor 110 also communicates a signal to a lateral acceleration modifier 118. The lateral acceleration modifier 118 identifies a recommended adjustment to the current recommendation made by the lateral acceleration table 122. The recommend adjustment is based on the performance of a calculation or based on the comparison of the signal to a table.

The recommendation from the lateral acceleration table 122 and the recommended adjustment made by the lateral acceleration modifier 118 are communicated to the multiplier operator 124. The multiplier operator 124 modifies the recommendation of the lateral acceleration table 122 in view of the recommended adjustment made by the lateral acceleration modifier 118. In operation, the recommendation of the lateral acceleration table 122 will be decreased by the multiplier operator 124 if the speed is relatively low and will be increased by the multiplier operator 124 if the speed is relatively high. The multiplier operator 124 submits a modified current recommendation to the summation operator 116 of the controller 88.

The following examples illustrate the operation of the exemplary controller 88. When the vehicle is not moving, the speed table 114 may recommend a current of zero amp. Also, when the vehicle is not moving, the lateral acceleration table 122 may recommend a current of three amps. The lateral acceleration modifier 118 may recommend adjustment of the three amp recommendation to zero amp since speed is zero. In other words, the operational effect of the lateral acceleration modifier 118 may be to recommend zero percent of the lateral acceleration table 122 be accepted since speed is zero. The summation operator 116 will therefore receive recommendations of zero amps from the speed table 114 and zero amps from the multiplier operator 124. Therefore, the coil 80 will not receive current in this example.

When the vehicle is moving at a speed of ten miles per hour, the speed table 114 may recommend a current to the coil 80 of one amp. The lateral acceleration table 122 may recommend a current of three amps. The lateral acceleration modifier 118 may recommend adjustment of the three amp recommendation to thirty percent, or one amp (one third of the three amp recommendation). The summation operator 116 will therefore receive recommendations of one amp from the speed table 114 and one amp from the multiplier operator 124. Therefore, the coil 80 will receive two amps of current in this example.

When the vehicle is moving at a speed of thirty miles per hour, the speed table 114 may recommend a current to the coil 80 of one amp. The lateral acceleration table 122 may recommend a current of three amps. The lateral acceleration modifier 118 may recommend zero adjustment of the three amp recommendation, or full adoption of the recommendation of the lateral acceleration table 122. The summation operator 116 will therefore receive recommendations of one amp from the speed table 114 and three amps from the multiplier operator 124. Since the sum of the current recommendations is greater than three, a current limiting operator 130 of the exemplary controller 88 will limit the recommendation to three amps. Therefore, the coil 80 will receive three amps of current in this example. The controller 88 will control a current generating device 126 to direct a current of three amps to the coil 80.

FIG. 5 is a third graph illustrating the relationship between valve stiffness (torque) and the angle of the valve body 34 and the spool valve portion 50 relative to one another in the present invention. Line portions 104 and 106 represent relatively large increases in torque as the valve body 34 and the spool valve portion 50 rotate relative to one another from on-center. Line portions 108 and 110 represent relatively small increases in torque as the valve body 34 and the spool valve portion 50 rotate relative to one another further from on-center. The line portions 108 and 110 are comparable to the line portions 90, 92, 98, 100 in FIG. 2. FIG. 6 is a fourth graph illustrating current drawn to generate a magnetic field with a magnetic coupling 60 of the power steering system 10 relative to an angle of a steering wheel. FIGS. 5 and 6 correspond with one another. Line portions 104 and 106 correspond to the portion of line 108 where current is being drawn. The line portions 108 and 110 correspond to portions of the line 108 where current is not being drawn. As shown in FIG. 6, a maximum current is being drawn when the steering wheel is on-center.

The position of the steering wheel with respect to being on-center or off-center corresponds to the positions of the valve body 34 and the spool valve portion 50 relative to one another. In other words, when the steering wheel is on-center, the valve body 34 and the spool valve portion 50 are on-center relative to one another (the valve 128 being open, no hydraulic assist). Thus, FIG. 6 also implicitly shows that the current is maximized when the valve body 34 and the spool valve portion 50 are on-center relative to one another. The difference between steering wheel movement relative to on-center and valve body 34-spool valve portion 50 movement relative to on-center is that extent of movement. For example, the steering wheel can move sixty degrees off-center while the valve body 34 and spool valve portion 50 can correspondingly move two degrees from on-center.

In operation, the pinion 14 and the spool shaft 24 are engaged with one another for turning at least two wheels of a vehicle in response to rotation of a steering wheel from an on-center orientation. The pinion 14 is variably assisted in movement with a hydraulic power steering device having a valve body 34 movable between a closed configuration and an open configuration. The valve body 34 is moved from the open configuration to the closed configuration in response to rotation of the spool shaft 24 relative to the pinion 14 to assist the pinion 14 in rotation for turning the at least two wheels. The amount of assistance provided by the hydraulic power steering device is responsive to the extent that the valve body 34 and the spool valve portion 50 are radially offset from one another; the more radially offset, the more assistance is provided. The details of the cooperation between the valve body 34 and the spool valve portion 50 are set forth fully in the patents incorporated by reference to this application. A torsion rod 36 having a first stiffness is disposed between the pinion 14 and spool shaft 24 to resist rotation of the spool shaft 24 relative to the pinion 14 and resist movement of the valve body 34 from the open configuration to the closed configuration. A variable magnetic coupling 60 having a second stiffness is disposed in parallel with the torsion rod 36 to resist rotation of the spool shaft 24 relative to the pinion 14 and resist movement of the valve body 34 from the closed configuration to the open configuration. The first stiffness and second stiffness cooperate to define an overall steering stiffness. The second stiffness generated by the variable magnetic coupling 60 is varied with an electric coil 80 to vary the overall steering stiffness. The second stiffness is maximized when the steering wheel is in the on-center orientation.

The relationship between current and changes in the angle between the valve body 34 and the spool valve portion 50 is determined through a subjective evaluation of the vehicle. The relationship is usually very specific to any particular operating environment. For example, if a constant, direct feel of the vehicle is desired, the knee of the valve stiffness curve will be sharper, or more pronounced. On the other hand, if a valley feel is desired, the knee of the valve stiffness curve will be more subtle and positioned at a point that corresponds to the stiffness of the entire system (tires, column, etc) beginning to become stiff.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling a resistance to turning steerable wheels of a vehicle including a controller, a steering wheel angle sensor responsive to rotation of a steering wheel, a speed sensor, and a coil for varying stiffness of a valve, said method comprising the steps of:

turning the wheels of the vehicle in response to rotation of the steering wheel;

sensing a signal corresponding to an angle of the steering wheel;

sensing a signal corresponding to a speed of the vehicle;

inputting the sensed signals for the angle of the steering wheel and the speed of the vehicle into the controller;

determining a lateral acceleration based on the sensed signals;

determining a recommended current rate of the coil based upon the lateral acceleration;

determining an adjustment to the recommended current rate of the coil based upon the sensed signal for the speed of the vehicle;

multiplying the recommended current rate of the coil and the adjustment to the recommended current rate of the coil to produce a modified current rate of the coil; and applying the modified current rate of the coil to energize the coil and vary the stiffness of the valve to vary the resistance to turning the steerable wheels.

2. A method as set forth in claim 1 further comprising the steps of:

determining a second recommended current rate of the coil based upon the sensed speed of the vehicle;

adjusting the modified current rate of the coil based upon the second recommended current rate of the coil to determine an adjusted modified current rate of the coil; and said step of applying the modified current rate of the coil is further defined as the step of applying the adjusted modified current rate of the coil to energize the coil and vary the stiffness of the valve to vary the resistance to turning the steerable wheels.

3. A method as set forth in claim 2 wherein said step of adjusting the modified current rate of the coil is further defined as the step of performing a mathematical function to the modified current rate of the coil and the second recommended current rate of the coil to determine the adjusted modified current rate of the coil.

4. A method as set forth in claim 3 wherein said step of performing the mathematical function is further defined as summing the modified current rate of the coil and the second recommended current rate of the coil to determine the adjusted modified current rate of the coil.

5. A method as set forth in claim 1 further comprising the step of limiting the modified current rate of the coil applied to energize the coil to a current range of the coil.

6. A method as set forth in claim 5 wherein said step of limiting the modified current rate of the coil is further defined as the step of limiting the modified current rate of the coil applied to energize the coil to no more than 3.0 Amps if the modified current rate of the coil is outside of the current range of the coil.

7. A method as set forth in claim 1 wherein said step of determining the recommended current rate of the coil based upon the lateral acceleration is further defined as the step of calculating the recommended current rate of the coil based upon the lateral acceleration.

8. A method as set forth in claim 1 wherein said step of determining the recommended current rate of the coil based upon the lateral acceleration is further defined as the step of comparing the lateral acceleration to a table to determine the recommended current rate of the coil.

9. A method as set forth in claim 1 wherein said step of determining the adjustment to the recommended current rate of the coil based upon the sensed signals is further defined as the step of calculating the recommended current rate of the coil based upon the sensed signals to determine the adjustment to the recommended current rate of the coil.

10. A method as set forth in claim 1 wherein said step of determining the adjustment to the recommended current rate of the coil based upon the sensed signals is further defined as the step of comparing the sensed signals to a table to determine the adjustment to the recommended current rate of the coil.

11. A method for controlling a resistance to turning steerable wheels of a vehicle including a controller, a steering wheel angle sensor responsive to rotation of a steering wheel, a speed sensor, and a coil for varying stiffness of a valve, said method comprising the steps of:

turning the wheels of the vehicle in response to rotation of the steering wheel;

sensing a signal corresponding to an angle of the steering wheel;

sensing a signal corresponding to a speed of the vehicle;

inputting the sensed signals for the angle of the steering wheel and the speed of the vehicle into the controller;

determining a lateral acceleration based on the sensed signals;

determining a recommended current rate of the coil based upon the lateral acceleration;

determining an adjustment to the recommended current rate of the coil based upon the sensed signal for the speed of the vehicle;

modifying the recommended current rate of the coil by decreasing the recommended current rate of the coil if the vehicle speed is below a first predetermined speed to determine a modified current rate of the coil and increasing the recommended current rate of the coil if the vehicle speed is above a second predetermined speed to determine the modified current rate of the coil; and applying the modified current rate of the coil to energize the coil and vary the stiffness of the valve to vary the resistance to turning the steerable wheels.

12. A method as set forth in claim 11 further comprising the steps of:

determining a second recommended current rate of the coil based upon the sensed speed of the vehicle;

adjusting the modified current rate of the coil based upon the second recommended current rate of the coil to determine an adjusted modified current rate of the coil; and said step of applying the modified current rate of the coil is further defined as the step of applying the adjusted modified current rate of the coil to energize the coil and vary the stiffness of the valve to vary the resistance to turning the steerable wheels.

13. A method as set forth in claim 12 wherein said step of adjusting the modified current rate of the coil is further defined as the step of performing a mathematical function to the modified current rate of the coil and the second recommended current rate of the coil to determine the adjusted modified current rate of the coil.

14. A method as set forth in claim 13 wherein said step of performing the mathematical function is further defined as summing the modified current rate of the coil and the second recommended current rate of the coil to determine the adjusted modified current rate of the coil.

* * * * *